United States Patent [19]

Dolan et al.

[11] Patent Number: 4,687,593

[45] Date of Patent: Aug. 18, 1987

[54] ALKYLARYL SULFONATE COMPOSITIONS

[75] Inventors: Michael J. Dolan, Town and Country; John N. Rapko, St. Louis; William W. Morgenthaler, Maryland Heights, all of Mo.

[73] Assignee: Monsanto Company, St. Louis, Mo.

[21] Appl. No.: 908,855

[22] Filed: Sep. 18, 1986

Related U.S. Application Data

[62] Division of Ser. No. 682,130, Dec. 17, 1984, Pat. No. 4,645,623.

[51] Int. Cl.[4] .............................................. C09K 3/00

[52] U.S. Cl. ................................... 252/182; 252/89.1

[58] Field of Search ............... 252/182, 89.1; 568/635; 585/24; 260/505 R, 505 S, 512 C, 512 R

[56] References Cited

U.S. PATENT DOCUMENTS

| | | | |
|---|---|---|---|
| 2,008,987 | 7/1935 | Marx et al. | 568/635 |
| 2,854,477 | 9/1958 | Steinhauer | 260/512 |
| 2,990,375 | 6/1961 | Steinhauer et al. | 260/512 R |
| 3,231,504 | 1/1911 | Marion et al. | 252/137 |
| 3,248,335 | 4/1966 | Teet et al. | 252/161 |
| 3,349,141 | 10/1967 | Sweeney | 585/24 |
| 3,585,253 | 6/1971 | Huang | 260/683 |
| 3,726,814 | 4/1973 | Lancz | 252/DIG. 4 |
| 3,776,962 | 12/1973 | Alul et al. | 260/624 C |
| 3,985,687 | 10/1976 | Inamorato et al. | 252/551 |
| 4,244,840 | 1/1981 | Straw | 252/540 |
| 4,645,623 | 2/1987 | Dolan et al. | 252/558 |

*Primary Examiner*—Paul Lieberman
*Assistant Examiner*—Hoa Van Le
*Attorney, Agent, or Firm*—R. Loyer; A. Cole

[57] ABSTRACT

Alkylarylsulfonate compositions containing low 2-phenyl alkylbenzene sulfonates and alkylated diphenyl oxide sulfonates are provided. The compositions have improved solubility and detergency properties and are useful in aqueous base detergent formulations. Also provided are intermediate compositions suitable for cosulfonation and neutralization.

7 Claims, No Drawings

ALKYLARYL SULFONATE COMPOSITIONS

This is a division of application Ser. No. 682,130, filed Dec. 17, 1984, now U.S. Pat. No. 4,645,623.

This invention relates alkylbenzene sulfonate compositions having improved solubility and excellent detergency properties. This invention also relates to intermediate compositions useful in the preparation of such sulfonate detergent materials. More particularly, the invention relates to compositions of alkylbenzene and alkylated diphenyl oxide sulfonates having improved solubility and detergency characteristics.

BACKGROUND OF THE INVENTION

Linear alkylbenzenes are widely used as intermediates to make detergent compounds. Particularly, straight chain alkylbenzene sulfonates are important surfactants in commercial detergent products because of their detergent properties, ease of biodegradation and other desirable properties.

The advantages of the alkylbenzene sulfonates are known to vary somewhat in view of the isomer mix of the alkylbenzene intermediate.

Linear alkylbenzene sulfonate (LAS) is produced in great volumes using linear alkylbenzene intermediates manufactured by two major commercial processes which differ primarily in the catalyst system employed. One process uses an aluminum chloride catalyst and the other process uses hydrogen fluoride catalyst. The phenyl isomer distribution in LAS produced from intermediates of the two processes are recognized as "high" 2-phenyl product from the $AlCl_3$ process and as "low" 2-phenyl product from the HF process. Typical phenyl isomer distribution for average molecular weight products characterized as high 2-phenyl is about 30% 2-phenyl isomer and about 22% 3-phenyl isomer whereas the products characterized as low 2-phenyl is about 20% 2-phenyl isomer and about 20% 3-phenyl isomer or having a more balanced isomer distribution.

It is known that the sulfonates of long chain alkylbenzenes have different properties depending upon the position of the aromatic group on the alkyl chain. For most applications in the surface active field, arylalkanes are desired in which the amount of the 2-arylalkane isomer is relatively low and various processes have been reported for obtaining arylalkane products containing minimum amounts of 2-arylalkane isomers. However, for certain applications, for example when one is more interested in obtaining maximum solubility in aqueous detergent formulations, a product containing a relatively high percentage of compounds in which the aromatic substituent is in the 2 or 3 position and correspondingly smaller percentages of isomers in which the aromatic substituent is positioned centrally with respect to the alkyl chain are advantageous. See for example U.S. Pat. No. 3,585,253 and U.S. Pat. No. 3,776,962.

Although processes are available to produce high 2-phenyl products having adequate aqueous solubility such processes represent a significant cost and a loss of other desirable properties of the low 2-phenyl product. Accordingly, to meet the substantial market demand for alkylbenzene sulfonates having good aqueous solubility in aqueous detergent formulations the detergent formulator has employed certain hydrotopes e.g. sodium xylene sulfonate in conjunction with the low 2-phenyl product to improve its aqueous solubility (see for example, U.S. Pat. No. 3,231,504). The use of such hydrotropes suffers the disadvantages of adding to the cost of the formulation without any improvement in its detergent properties. These and other disadvantages are overcome by the present invention.

SUMMARY OF THE INVENTION

In accordance with the invention there is provided an alkylbenzene sulfonate composition of improved aqueous solubility and detergency which comprises low 2-phenyl alkylbenzene sulfonate and an effective amount of alkylated diphenyl oxide sulfonate.

Also provided is an intermediate composition suitable for sulfonation and neutralization to form a detergent surfactant material of improved aqueous solubility comprising from about 85% to 95% by weight low 2-phenyl alkylbenzene and from about 5% to about 15% by weight of alkylated diphenyl oxide.

Further, in accordance with this invention there is provided liquid detergent compositions comprising water and as an essential active detergent ingredient an alkylbenzene sulfonate composition comprising from about 85% to 95% by weight low 2-phenyl alkylbenzene sulfonate and from about 5% to 15% by weight alkylated diphenyl oxide sulfonate.

DETAILED DESCRIPTION OF THE INVENTION

It has been found that the aqueous solubility and detergency of low 2-phenyl alkylbenzene sulfonates in aqueous detergent formulations is improved in the presence of an effective amount of an alkylated diphenyl oxide sulfonate. In this manner low 2-phenyl alkylbenzene sulfonate compositions are suitable as active detergent materials for use in liquid detergent formulations as a direct substitute for high 2-phenyl alkylbenzene sulfonates.

As used in this specification and claims the term "low 2-phenyl" characterizes commercially available alkylbenzenes having a phenyl isomer distribution substantially uniform across the alkane and less than about 22% 2-phenyl isomer and the term "high 2-phenyl" characterizes commercially available alkylbenzenes having a phenyl isomer distribution predominately in the 2 and 3 position of the alkane and more than about 25% 2-phenyl isomer.

Preferred low 2-phenyl alkylbenzenes used in accordance with this invention can be prepared by alkylating benzene with high molecular weight straight chain monoolefins in the presence of hydrogen fluoride as the catalyst. The straight chain monoolefins can be obtained by dehydrogenation of straight chain paraffins over a suitable catalyst to provide a mixture containing the desired straight chain monoolefins and the unreacted straight chain paraffins. This mixture is passed to the alkylation unit wherein the straight chain monoolefins can be used to alkylate benzene to form the desired straight chain alkylbenzene compounds and the unreacted straight chain paraffins can be readily separated therefrom by such procedures as distillation. Desired straight chain alkylbenzene compounds are mixtures of varying molecular weights. The alkyl group is linear with chain lengths of 10 to 16 carbon atoms. Preferred mixtures have an average molecular weight in the range of about 230 to 275 or more and an average alkyl carbon number of about 10.8 to 13.4 or more. Particularly preferred are alkylbenzenes having an average molecular weight of about 236 and an average alkyl carbon number of about 11.3. Such compounds are low 2-phenyl alkyl benzenes typically having a 2-phenyl isomer content of about 15% or so.

The alkylated diphenyl oxide used in accordance with this invention are known materials and can be prepared by the alkylation of diphenyl oxide alternatively known as diphenyl ether. See for example U.S. Pat. Nos. 2,854,477 and 3,248,335. Preferred alkylated diphenyl oxides can be represented by the general formula:

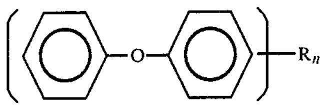

wherein R is alkyl of about 8 to about 16 carbon atoms or mixtures thereof and n averages between 1 and about 1.3 or more. The alkyl group can be straight or branched chain. Particularly preferred are linear alkyl groups of 10 to about 16 carbon atoms.

The above described alkylbenzene compounds and the alkylated diphenyl oxides can be sulfonated with any suitable sulfonating agent, such as sulfur trioxide, mixtures of sulfur dioxide and sulfur trioxide, chlorosulfonic acid, and the like by conventional procedures. The resulting sulfonic acid can be neutralized with an alkali metal hydroxide or carbonate, such as sodium carbonate or potassium hydroxide, or by the use of any other suitable base conventionally employed in the preparation of ammonium or alkali metal salts of aryl sulfonic acids.

The alkylbenzene sulfonate compositions of this invention, having unexpected aqueous solubility and detergency properties, can be prepared by mixing an ammonium or alkali metal sulfonate of low 2-phenyl alkylbenzenes with an effective amount of an ammonium or alkali metal sulfonate of alkylated diphenyl oxide. Alternatively, and preferably, the composition can be prepared by mixing the intermediate low 2-phenyl alkylbenzene and the alkylated diphenyl oxide to provide an intermediate mixture suitable for cosulfonation and neutralization. Such intermediate mixtures are particularly advantageous for supplying detergent producers/formulators with low 2-phenyl alkylbenzene compositions suitable for sulfonation and neutralization to manufacture low 2-phenyl alkylbenzene sulfonate compositions having improved aqueous solubility and detergent characteristics which are useful in formulating a wide range of light duty and heavy duty liquid and spray dried detergent products.

The amount of the alkylated diphenyl oxide employed in the low 2-phenyl alkylbenzene compositions of the invention is sufficient to reduce the cloud point of conventional liquid detergent formulations, using low 2-phenyl alkylbenzene sulfonates as an essential active ingredient, to about 2° C., preferably to less than 0° C. The amount employed is generally in the range of about 5% to about 15% or more by weight of alkylated diphenyl oxide based on the combined weight of the low 2-phenyl alkylbenzene and the alkylated diphenyl oxide. Particularly preferred is a composition comprising about 8% to 12% by weight of the alkylated diphenyl oxide.

The liquid detergent compositions of this invention are water based formulations wherein the essential active detergent ingredient is an alkylbenzene composition of from about 85% to 95% by weight low 2-phenyl alkylbenzene sulfonate and from about 5% to 15% by weight alkylated diphenyl oxide sulfonate. Typically, the liquid detergent compositions contain 10% to 30% or more by weight of the alkylbenzene composition. The liquid detergent compositions of the invention can optionally contain various other ingredients, such as other surfactants, water soluble inorganic builder salts, hydrotropic salts, soil suspending agents, compatible perfumes, corrosion or tarnish inhibitors, coloring materials, viscosity modifiers, bleaching agents, germicides and the like, commonly employed in formulating light or heavy duty liquid detergents in an aqueous base.

This invention is further illustrated by, but not limited to, the following examples wherein all parts and percentages are by weight, unless otherwise indicated.

EXAMPLE 1

A liquid detergent base stock was prepared by mixing solutions of an alcohol ethoxy sulfate and ammonium xylene sulfonate together with water such that the base stock when further mixed with an alkylbenzene sulfonate material would yield the following liquid detergent composition in parts by weight.

| Component | Parts |
|---|---|
| $C_{12-15}$ alcohol ethoxy (3) sulfate ($NH_4$) | 5 |
| Ammonium xylene sulfonate ($NH_4$) | 9 |
| Alkylbenzene sulfonate (Na or $NH_4$) | 30 |
| Water | 56 |

With stirring, $C_{11}$ low 2-phenyl alkylbenzene sulfonic acid was added to the above base stock then sodium or ammonium hydroxide was added, while maintaining the temperature below 30° C., to adjust the pH of the mixture to 6.8-7.0. Minor amounts of perfume and dye were added to complete the liquid detergent formulation.

The cloud point of the liquid detergent formulation was determined by gradually heating or cooling the formulation in a vessel contained in a temperature bath. A thermocouple bent into a spiral shape and attached to a reciprocating agitator served both to stir the formulation and measure its temperature. Reproducibility of the cloud point measurement was generally within 1° C. The cloud point of the liquid detergent formulation prepared with $C_{11}$ low 2-phenyl alkylbenzene sulfonate (Na) was found to be 37° C. A liquid detergent formulation prepared in the same manner but substituting $c_{11}$ high 2-phenyl alkylbenzene sulfonate in place of the $C_{11}$ low 2-phenyl product had a cloud point of −8° C. Substituting $C_{12}$ low 2-phenyl alkylbenzene sulfonate for the $C_{11}$ low 2-phenyl product in the same manner provided a liquid detergent formulation having a cloud point of 26° C. The liquid detergent formulations containing the low 2-phenyl alkylbenzene sulfonates exhibited layering upon standing for 1-10 days at room temperature whereas the formulation containing the high 2-phenyl alkylbenzene sulfonate was stable for one year at room temperature.

EXAMPLE 2

Nine parts by weight of $C_{11}$ low 2-phenyl alkylbenzene sulfonic acid, prepared by oleum sulfonation of the corresponding alkylbenzene, were mixed with one part of $C_{10}$ alkyl diphenyl oxide sulfonic acid. The resultant composition was utilized to prepare a liquid detergent formulation identical to those of Example 1 except that 30 parts of the 9:1 blend replaced 30 parts of alkylbenzene sulfonic acid. The cloud point of the resultant detergent formulation was −6° C. and no layering was observed through five freeze/thaw cycles (12 hrs. −10° C.: 12 hrs. 25° C.) or after one year storage at room temperature. Similar formulations were prepared substituting $C_{12}$ and $C_{16}$ alkyl diphenyl oxide sulfonic acid in place of the $C_{10}$ alkyl diphenyl oxide sulfonic acid in the alkylbenzene composition. The resulting cloud points were −4° C. and −8° C., respectively.

EXAMPLE 3

Ninety parts of $C_{11}$ low 2-phenyl alkylbenzene and 10 parts of decyl diphenyl oxide (80% monoalkylation and 20% dialkylation products) were mixed to provide a clear, homogeneous liquid composition. This composition was then sulfonated in a continuous air/$SO_3$ sulfonation unit at a rate of approximately 30 pounds (11.8 kg) per hour using conventional techniques for alkylbenzene sulfonation. The resulting sulfonic acid composition had a Klett color of 65 (5% solution, 40 mm cell). A liquid detergent formulation made from this sulfonic acid composition according to the procedures of Example 1 provided a cloud point of −7° C. and was stable through five freeze/thaw cycles.

In the same manner liquid detergent formulations were prepared except the decyl diphenyl oxide component was replaced with an equal amount of the component listed in Table I with the result as indicated.

TABLE I

| Component | Cloud Point |
|---|---|
| $C_{12}$ alkyl diphenyl oxide | −5° C. |
| $C_{16}$ alkyl diphenyl oxide | −6° C. |
| $C_{18-22}$ alkyl diphenyl oxide | 6° C. |
| isobutyl diphenyl oxide | −6° C. |
| diisopropyl diphenyl oxide | −6° C. |
| diethyl diphenyl oxide | −6° C. |
| tetramethyl diphenyl oxide | −2° C. |
| diphenyl oxide | 28° C. |

EXAMPLE 4

Representative liquid detergent formulations, containing 30% by weight of an alkylbenzene composition, prepared in accordance with Examples 1, 2 and 3 and having a cloud point less than 0° C., were tested for cleaning performance. A standard plate washing foam test using 9 inch (22.9 cm) diameter dinner plates each soiled with approximately 4.6 ml of a soil composition of 48% by weight vegetable shortening (Crisco TM) 50% by weight wheat flour (Gold Medal TM) and 2% oleic acid containing a trace of Sudan Red 4BA dye was employed. The following results were obtained which are an average of several runs.

TABLE II

| Parts | Alkylbenzene Composition | No. of Plates Washed |
|---|---|---|
| 100 | $C_{11}$ high 2-phenyl LAS | 19.5 |
| 100 | $C_{11}$ low 2-phenyl LAS | 19.0 |
| 90 | $C_{11}$ low 2-phenyl LAS | 20.5 |
| 10 | $C_{10}$ alkyl diphenyl oxide sulfonate | |
| 90 | $C_{11}$ low 2-phenyl LAS | 20 |
| 10 | $C_{12}$ alkyl diphenyl oxide sulfonate | |
| 90 | $C_{11}$ low 2-phenyl LAS | 20 |
| 10 | $C_{16}$ alkyl diphenyl oxide sulfonate | |
| 90 | $C_{11}$ low 2-phenyl LAS | 18 |
| 10 | isobutyl diphenyl oxide sulfonate | |
| 90 | $C_{11}$ low 2-phenyl LAS | 16 |

TABLE II-continued

| Parts | Alkylbenzene Composition | No. of Plates Washed |
|---|---|---|
| 10 | diisopropyl diphenyl oxide sulfonate | |
| 90 | $C_{11}$ low 2-phenyl LAS | 17.5 |
| 10 | tetramethyl diphenyl oxide sulfonate | |
| 90 | $C_{11}$ low 2-phenyl LAS | 17.5 |
| 10 | diethyl diphenyl oxide sulfonate | |
| 90 | $C_{11}$ low 2-phenyl LAS | 17.5 |
| 10 | ammonium xylyl sulfonate* | |

*Conventional hydrotrope to reduce cloud point to −6° C.

EXAMPLE 5

A concentrated liquid dishwashing detergent formulation, typical of current consumer products, was prepared by mixing 5 parts of 28% aqueous ammonium hydroxide with 35 parts of water, followed by addition of 12 parts of 40.6% aqueous ammonium xylene sulfonate. To the mixture 25 parts of $C_{11}$ high 2-phenyl alkylbenzene sulfonic acid were added while maintaining the temperature below 30° C. Then, 3.5 parts of urea, 14 parts of 58% aqueous $C_{12-15}$ alcohol (3) ethoxy ammonium sulfate and 3 parts cocodiethanolamide were added in sequence. The final pH was adjusted to 6.5–7.5. This liquid detergent formulation exhibited a cloud point of −7° C.

A liquid detergent formulation prepared in the same manner except replacing the high 2-phenyl alkylbenzene sulfonic acid with a cosulfonated mixture of 90 parts $C_{11}$ low 2-phenyl alkylbenzene and 10 parts $C_{10}$ alkyl diphenyl oxide exhibited a cloud point of −7° C. which contrasts with a cloud point of 23° C. when $C_{11}$ low 2-phenyl alkylbenzene sulfonic acid was employed as a direct replacement for the high 2-phenyl material.

Although the invention has been described in terms of specified embodiments which are set forth in considerable detail, it should be understood that this is by way of illustration only and that the invention is not necessarily limited thereto since alternative embodiments and operating techniques will become apparent to those skilled in the art in view of the disclosure. Accordingly, modifications are contemplated which can be made without departing from the spirit of the described invention.

What is claimed is:

1. A detergent intermediate suitable for sulfonation and neutralization comprising from about 85% to 95% by weight low 2-phenyl alkylbenzene and about 5% to about 15% by weight of an alkylated diphenyl oxide.

2. The detergent intermediate of claim 1 wherein the low 2-phenyl alkylbenzene has an average molecular weight in the range of about 230 to about 275 and an average alkyl carbon number of about 10.8 to about 13.4

3. The detergent intermediate of claim 1 wherein the alkylated diphenyl oxide is represented by the general formula

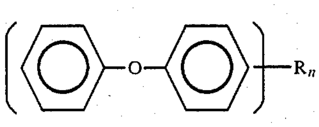

wherein R is straight or branched chain alkyl of about 8 to about 16 carbon atoms or mixtures thereof and n averages between 1 and about 1.3.

4. The detergent intermediate of claim 1 wherein the amount of the alkylated diphenyl oxide is about 8% to about 12% by weight of the combined weight of alkylbenzene and alkylated diphenyl oxide.

5. The detergent intermediate of claim 1 wherein the low 2-phenyl alkylbenzene is a mixture having an average molecular weight of about 236 and an average alkyl carbon number of about 11 or an average molecular weight of about 243 and an average alkyl carbon number of about 12.

6. The detergent intermediate of claim 5 wherein the alkylated diphenyl oxide is decyldiphenyl oxide, dodecyldiphenyl oxide or hexadecyldiphenyl oxide.

7. The detergent intermediate of claim 1 wherein the low 2-phenyl alkylbenzene is $C_{11}$ alkyl benzene of an average molecular weight of about 236 and the alkylated diphenyl oxide is decyldiphenyl oxide.

* * * * *